United States Patent
Tanijiri et al.

(10) Patent No.: US 7,468,843 B2
(45) Date of Patent: Dec. 23, 2008

(54) OPTICAL SYSTEM AND DISPLAY APPARATUS

(75) Inventors: Yasushi Tanijiri, Osakasayama (JP); Hiroaki Ueda, Suita (JP); Ichiro Kasai, Toyonaka (JP); Takao Kobayashi, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/505,771

(22) Filed: Aug. 17, 2006

(65) Prior Publication Data

US 2006/0274440 A1 Dec. 7, 2006

Related U.S. Application Data

(62) Division of application No. 10/464,268, filed on Jun. 18, 2003, now Pat. No. 7,136,228.

(30) Foreign Application Priority Data

Sep. 25, 2002 (JP) .............................. 2002-279806
Mar. 17, 2003 (JP) ............................... 2003-72110

(51) Int. Cl.
*G02B 27/14* (2006.01)
*G09G 5/00* (2006.01)

(52) U.S. Cl. .......................................... 359/631; 345/7
(58) Field of Classification Search .................... 359/13, 359/630, 631; 345/7–9
See application file for complete search history.

(56) References Cited

U.S. PATENT DOCUMENTS

| | | | |
|---|---|---|---|
| 4,013,465 A | 3/1977 | Clapham et al. | 430/11 |
| 4,241,980 A | 12/1980 | Mihalakis et al. | 359/455 |
| 5,452,130 A | 9/1995 | Furuya | 359/637 |
| 5,594,588 A | 1/1997 | Togino | 359/631 |
| 5,943,171 A * | 8/1999 | Budd et al. | 359/631 |
| 6,024,473 A | 2/2000 | Fadel | 362/516 |
| 6,491,851 B1 | 12/2002 | Keller et al. | 264/1.32 |
| 6,578,983 B2 | 6/2003 | Holten | 362/217 |
| 2002/0018295 A1* | 2/2002 | Okuyama et al. | 359/443 |

FOREIGN PATENT DOCUMENTS

| | | |
|---|---|---|
| JP | 5-303054 A | 11/1993 |
| JP | 3155341 B2 | 12/1993 |
| JP | 11-95160 A | 4/1999 |
| JP | 2001-117045 A | 4/2001 |
| JP | 2001-188194 A | 7/2001 |

* cited by examiner

*Primary Examiner*—Alessandro Amari
(74) *Attorney, Agent, or Firm*—Sidley Austin LLP

(57) ABSTRACT

A display apparatus which has a mirror with a free curved reflective surface of which curvature fluctuates with inflection points, a liquid crystal display (LCD), a back light and a polarizer. Light of an image which was modulated by the LCD is reflected by the free curved reflective surface and passes through the polarizer. Then, the light is directed to an optical pupil. Since the curvature of the free curved reflective surface fluctuates with inflection points, curvature of field and distortion can be corrected properly, and an image of high quality can be formed.

15 Claims, 12 Drawing Sheets

F I G. 3
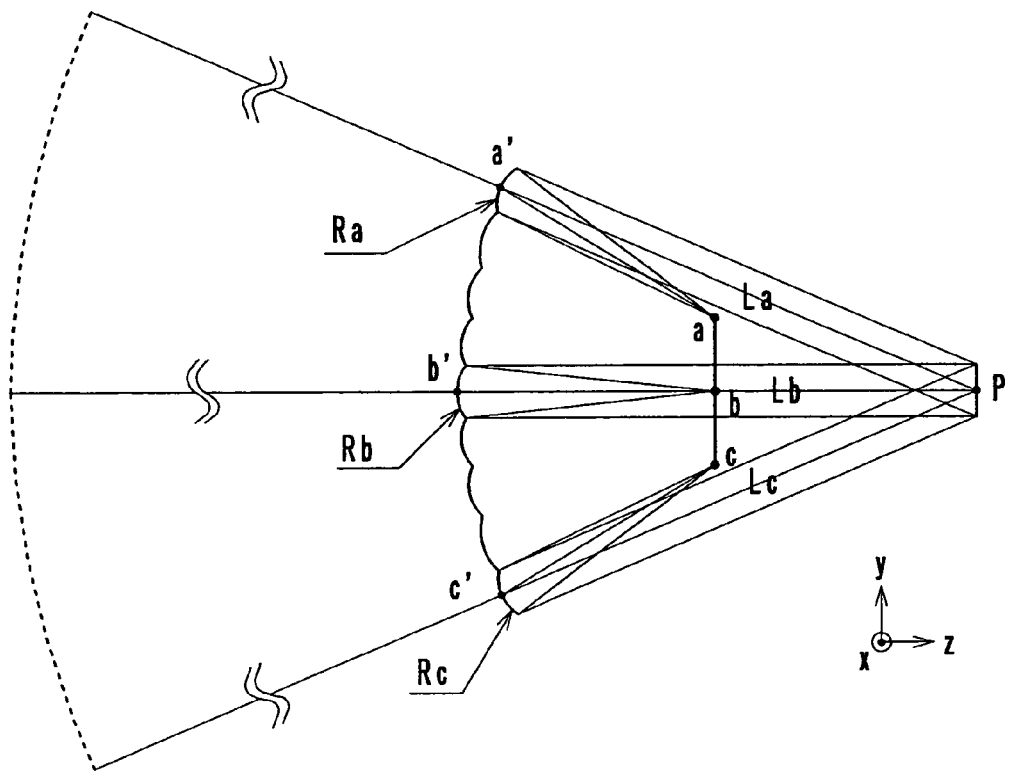
F I G. 4
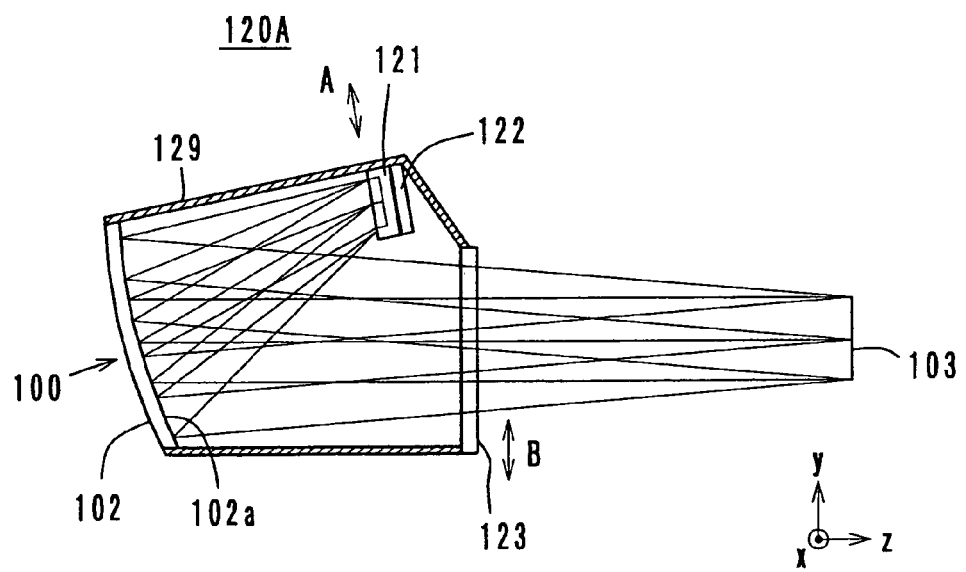

F I G. 7
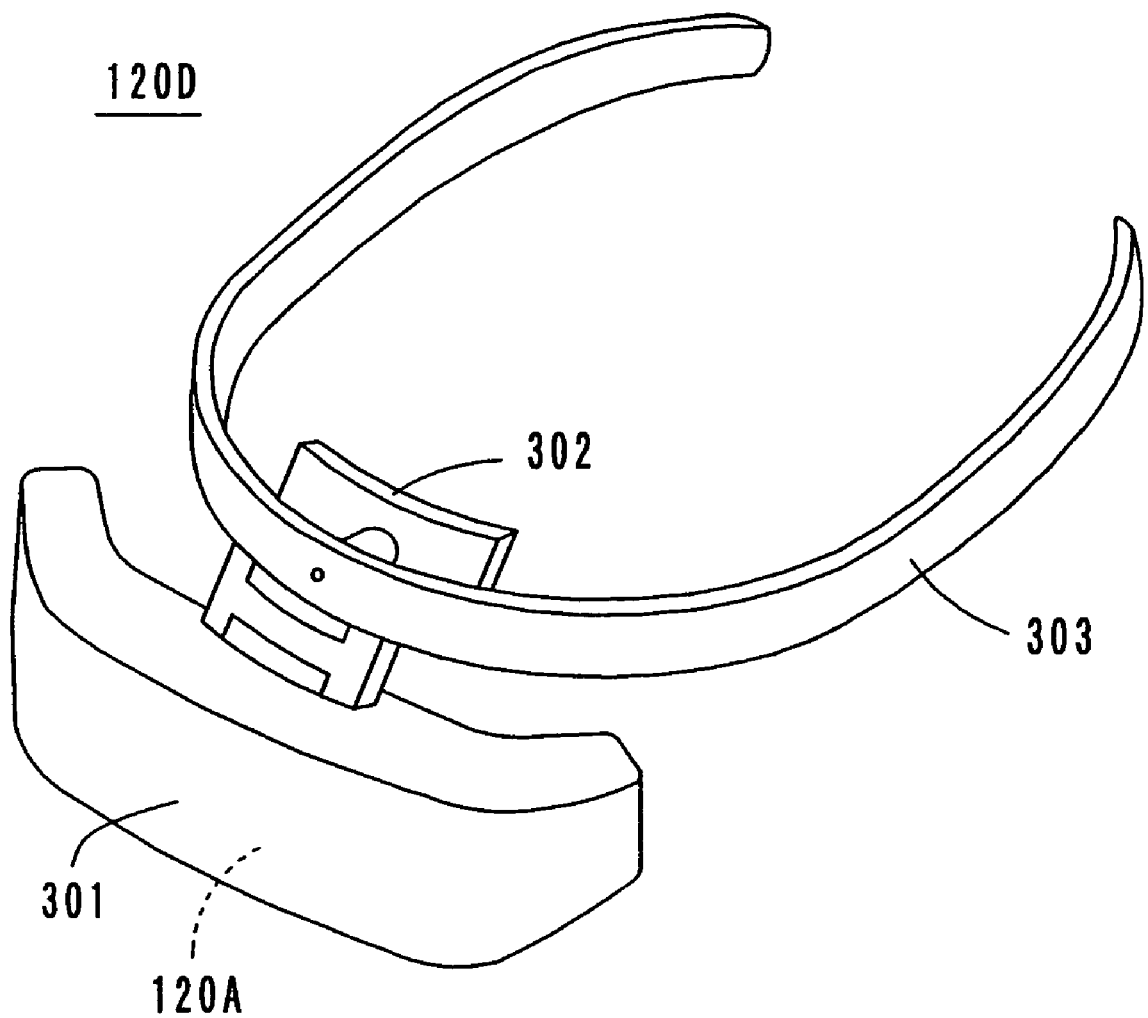

MAGNIFIED

BGR
(COLOR FILTER TYPE)

MAGNIFIED (FIELD SEQUENTIAL
DRIVING TYPE)

(REFRACTION)

(SURFACE REFLECTION)

OPTICAL SYSTEM AND DISPLAY APPARATUS

This application is a divisional application of application Ser. No. 10/464,268, filed Jun. 18, 2003, now U.S. Pat. No. 7,136,228, issued Nov. 14, 2006, which is based on Japanese Patent Application Nos. 2002-279806 and 2003-72110, the contents of which are hereby incorporated by reference.

BACKGROUND OF THE INVENTION

1. Field of the Invention

The present invention relates to an optical system, and more particularly to an optical system comprising a free curved reflective surface. The present invention also relates to a display apparatus, and more particularly to a display apparatus which is suited to be used as a head mounted type, which is called an HMD (head mounted display).

2. Description of Related Art

Japanese Patent No. 3155341 (reference 1) discloses a display apparatus which comprises an aspherical concave mirror of which curvature in the plane of incidence of the optical axis is set such that a plane image can be formed. Consequently, on the display, images of high picture quality can be seen.

U.S. Pat. No. 5,594,588 (reference 2) discloses a display apparatus which comprises an aspherical concave mirror of which curvature in a direction perpendicular to the plane of incidence of the optical axis is set such that distortion can be minimized. Consequently, on the display, images of high picture quality can be seen.

Japanese Patent Laid Open Publication No. 11-95160 (reference 3) discloses a head mounted display apparatus which comprises a half mirror and a polarizer which is laminated on the half mirror. Thereby, the quantity of reflected light is reduced.

However, the display apparatus of the reference 1 has a problem that correction of distortion is sacrificed for the sake of achieving a plane image. More specifically, as FIG. 17 shows, a rectangular image 500 is reflected on a free curved reflective surface 501 to be directed to an optical pupil 510, and a virtual image 505 is seen on the optical pupil 510 as a distorted image 505'.

Also, the display apparatus of the reference 2 has a problem that correction of curvature of field is sacrificed for the sake of minimizing distortion or a problem that resolution is low. More specifically, as FIG. 18 shows, a rectangular image 500 is reflected on a free curved reflective surface 502 to be directed to an optical pupil 510, and a virtual image 506 is seen on the optical pupil 510 as a rectangular image 506'. Distortion was corrected, and the image 506 is rectangular. However, the curvature of field of the image 506' is large and more than 1 diopter, so that the image is difficult to see. With this free curved reflective surface 502, if it is tried to correct curvature of field as well as distortion, the image 506' will have a low resolution and will be blurred.

In the display apparatus disclosed by the reference 3, a half mirror is used. Therefore, although the quantity of external light is reduced to a half, 25% of the quantity of light is reflected to be directed to the eyes of an observer, which makes the image difficult to see. Also, because only 25% of the quantity of light from the image is used, the image is dark. Further, because the light from the image is reflected by the half mirror, the apparatus is large.

Recently, various types of color image forming apparatuses have been developed and provided. Color image forming apparatuses are generally divided into a color filter type and a field sequential driving type.

FIG. 14a shows a screen on which images A and B are displayed. FIG. 14b schematically shows display elements of the color filter type, and FIG. 14c schematically shows display elements of the filed sequential driving type.

In the color filter type, a red color filter R, a green color filter B and a blue color filter B are provided for each pixel, and depending on the luminous balance of the three filters, a color image is formed. In this type of color image forming apparatus, because one dot is formed by use of three filters, a color shift in accordance with the pitch of the filters occur. The color shift is so small that it will not be a practical problem in an apparatus which enables an observer to see the formed image directly. However, in an apparatus which magnifies a formed image, such as an HMD, the color shift is also magnified, and the picture quality will be lowered.

On the other hand, in the filed sequential driving type, as shown by FIG. 14c and as disclosed by Japanese Patent Laid Open. Publication No. 2001-117045 (reference 4) and Japanese Patent Laid Open Publication No. 2001-188194 (reference 5), the illuminating light is switched among red, green and blue sequentially at a high speed, and synchronously, in each pixel, the light of red, the light of green and the light of blue are modulated in accordance with image signals of the respective wavelengths. Consequently, a color image can be seen by an after image effect. As a modulating device, an LCD (liquid crystal display), a DMD (digital micromirror device) made by U.S. Texas Instruments Incorporated or other suitable devices can be used.

In the field sequential driving type, an image of R, an image of G and an image of B are formed in one pixel sequentially, and a color shift does not occur. When the color filter type and the field. sequential driving type are to form images of the same resolution, the necessary number of pixels in the field sequential driving type is one third of that in the color filter type. When the color filter type and the field sequential driving type have the same displaying area, the size of each pixel of the filed sequential driving type is three times as large as that of the color filter type, and the field sequential driving type has a higher vignetting factor and can form brighter images.

In an optical system for magnifying a formed image and displaying the magnified image, an optical element which diverts a bundle of rays is necessary, and a refraction element or a reflection element is used. With respect to diversions of bundles of rays by a refraction element, as FIG. 15 shows, a medium refracts a bundle of red rays R, a bundle of green rays G and a bundle of blue rays B at different angles because the medium has different refractive indexes to the respective wavelengths of R, G and B. Thereby, chromatic aberration is caused.

On the other hand, with respect to bends of bundles of rays by a reflection element, as FIG. 16 shows, a reflective element reflects a bundle of red rays R, a bundle of green rays G and a bundle of blue rays B at the same angle, and chromatic aberration is not caused. Japanese Patent Laid Open Publication No. 5-303054 (reference 6) discloses a magnifying optical system which uses a reflective surface with this characteristic. However, the reference 6 merely discloses the magnifying optical system.

SUMMARY OF THE INVENTION

An object of the present invention is to provide an optical system and a display apparatus which can form an image of high picture quality by correcting both curvature of field and distortion.

Another object of the present invention is to provide a display apparatus which is small and light, which prevents incidence of external light and which displays images of high picture quality.

Further, another object of the present invention is to provide a display apparatus which does not cause a color shift and which is suited to be used as a head mounted display.

In order to attain the objects, an optical system according to a first aspect of the present invention comprises a free curved reflective surface of which curvature fluctuates with inflection points.

In the optical system according to the first aspect, since the curvature of the free curved reflective surface fluctuates with inflection points, curvature of field and distortion can be corrected properly, and images of high picture quality can be formed.

A display apparatus according to a second aspect of the present invention comprises: a display device which displays an image, and a magnifying optical system which directs an image displayed by the display device to an observer's pupil and which enables the observer to see the image as a virtual image, and the magnifying optical system comprises a free curved reflective surface of which curvature fluctuates with inflection points.

A display apparatus according to a third aspect of the present invention comprises a light source which emits bundles of rays of different wavelengths; an image forming device which forms a color image by a field sequential driving method in which while the image forming device is illuminated with the bundles of rays sequentially, the bundles of rays are modulated in accordance with the respective wavelengths in each pixel of the image forming device; and a magnifying optical system which reflects the bundles of rays by the image forming device on a surface which performs surface reflection to direct the modulated bundles of rays to an observer's pupil.

In the display apparatus according to the third aspect, a color image is formed by a field sequential driving method, and bundles of rays of different wavelengths are modulated sequentially in each pixel. Therefore, a color shift does not occur. Also, the magnifying optical system is composed of only a surface which performs surface reflection, and chromatic aberration is not caused. Consequently, according to the third aspect, a display apparatus which does not cause a color shift can be obtained.

The surface which performs surface reflection may be a free curved reflective surface of which curvature fluctuates with inflection points like the one employed in the optical system according to the first aspect.

A display apparatus according to a fourth aspect comprises: a display device which displays an image; a magnifying optical system which directs light of the image displayed by the display device to an observer's pupil as a virtual image; and a polarizer which is located between the magnifying optical system and an optical pupil of the magnifying optical system. In the display apparatus, the magnifying optical system is composed of one reflective surface, and the light of the image emitted from the display device is linearly polarized light. Further, the polarizer is arranged so as to transmit the linearly polarized light. While unnecessary external light is cut by the polarizer, a bright image can be displayed.

BRIEF DESCRIPTION OF THE DRAWINGS

These and other objects and features of the present invention will be apparent from the following description with reference to the accompanying drawings, in which:

FIG. 3 is a view of an optical path which shows correction of curvature of field and distortion which are caused by the free curved reflective surface;

FIG. 4 is a schematic view of a display apparatus according to a second embodiment of the present invention;

FIG. 7 is a schematic view of a display apparatus according to a fifth embodiment of the present invention;

DETAILED DESCRIPTION OF PREFERRED EMBODIMENTS

Optical systems and display apparatuses according to preferred embodiments of the present invention are described with reference to the accompanying drawings.

First Embodiment; See FIGS. 1 and 2

Figure 1:
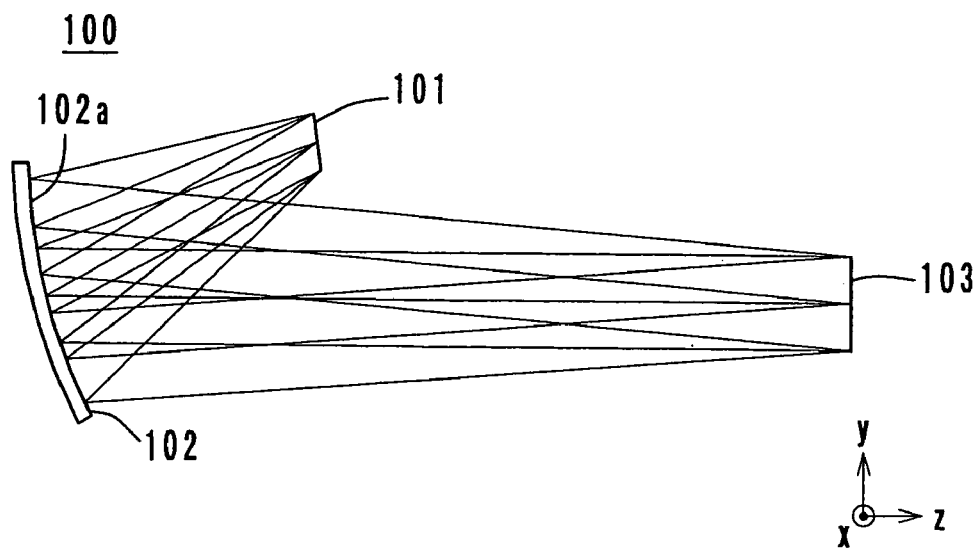
FIG. 1 is a schematic view of an optical system according to a first embodiment of the present invention.

FIG. 1 shows an optical system 100 according to a first embodiment of the present invention. The optical system 100 comprises a mirror 102 with a free curved reflective surface 102a. The numeral 101 denotes an image surface, and the numeral 103 denotes an optical pupil.

When the optical system 100 is used as an image pickup system, light coming from the optical pupil 103 is reflected by the free curved reflective surface 102a to be imaged on the image surface 101, and the image is picked up by an image pickup device. When the optical system 100 is used as an observing system, light on the image surface 101 such as light displayed on a liquid crystal display (LCD) etc. is reflected by the free curved reflective surface 102a to be directed to the optical pupil 103. The light incident to the optical pupil 103 is directed to an observer's eyes, and thereby, the observer can see a virtual image.

The shape of the free curved reflective surface 102a is defined by the following polynomial (1). According to the first embodiment, the constants shown by Table 1 are used.

$$Z = \frac{cr^2}{1 + SQRT[1-(1+k)c^2 r^2]} + \sum_{j=2}^{55} C_j x^m y^n \quad \text{Polynominal (1)}$$

$$j = [(m+n)^2 + m + 3n]/2 + 1$$

$z$: sag of surface in parallel to $z$ direction $c$: curvature at vertex $k$: conic constant $C_j$: coefficient of $x^m y^n$ The points a', b' and c' on a curved surface are points which receive the principal rays coming from three points a, b and c on an image surface, respectively, and the respective distances between the points a and a', b and b', and c and c' are La, Lb and Lc. The curvatures on the yz section of the surface at the points a', b' and c' are Ra, Rb and Rc. The center of the pupil is P.

First, in order to enable an observer to see a virtual image without curvature of field, the following condition must be fulfilled according to the Newton's formula.

$$1/La \times (Ra/2)/(Ra/2 + La) \quad (1)$$
$$= 1/Lb \times (Rb/2)/(Rb/2 + Lb)$$
$$= 1/Lc \times (Rc/2)/(Rc/2 + Lc)$$

In order to enable an observer to see a virtual image without distortion as well as without curvature of field, the sections of

TABLE 1

First Enbodiment

|  | C | 0 |  |  |  |  |
|---|---|---|---|---|---|---|
| free curved | Y | −1.93E−01 | X2 | −1.31E−02 | Y2 | −1.25E−02 |
| reflective | X2Y | −4.24E−05 | Y3 | −2.34E−05 | X4 | −3.86E−06 |
| surface | X2Y2 | −7.48E−06 | Y4 | −1.16E−06 | X4Y | 5.07E−08 |
| (axially | X2Y3 | −3.75E−07 | Y5 | −4.41E−09 | X6 | 1.12E−08 |
| asymmetric | X4Y2 | 8.33E−08 | X2Y4 | 3.66E−09 | Y6 | −1.48E−09 |
| aspherical surface) | X6Y | 4.95E−10 | X4Y3 | 8.87E−09 | X2Y5 | 2.43E−09 |
|  | X6Y2 | −4.75E−10 | X4Y4 | 1.08E−10 | X2Y6 | −1.75E−11 |
|  | X6Y3 | −7.54E−11 | X4Y5 | −1.79E−11 | X6Y4 | −4.86E−12 |
|  | X4Y6 | 1.44E−12 |  |  |  |  |

In the first embodiment, because C=0, the reference curvature is infinite, that is, the surface is plane. However, the reference curvature may be finite. The free curved reflective surface 102a is asymmetric in a direction parallel to the plane of incidence of the optical axis (x=0) and is symmetric with respect to the plane of incidence of the optical-axis in a direction perpendicular to the plane of incidence of the optical axis. Unlike an axially symmetric optical system, a free curved reflective surface does not have a fixed optical axis, and here, the line connecting the center of the image surface 101 to the center of the optical pupil 103 is defined as the optical axis Q (see FIG. 2).

Figure 2:
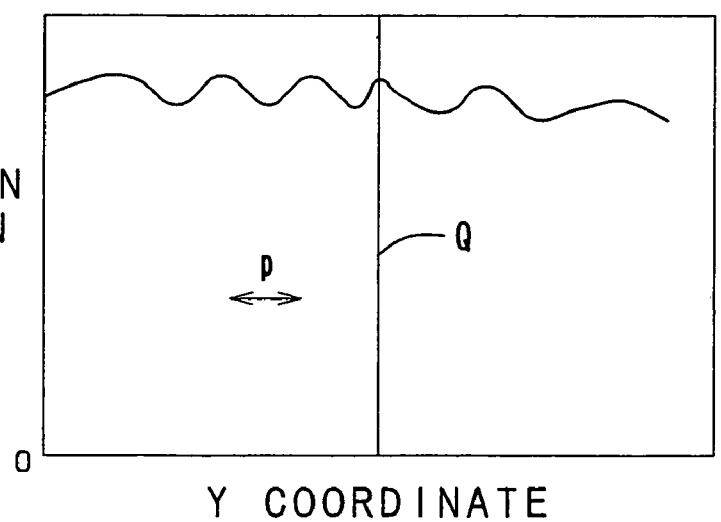
FIG. 2 is a graph which schematically shows the shape of a free curved reflective surface which is used in the optical system according to the first embodiment.

FIG. 2 schematically shows the shape of the free curved reflective surface 102a. The curvature of the surface 102a fluctuates with inflection points. When the curvature of the surface 102a in the y direction in the plane of incidence of the optical axis is shown in the y coordinate on the optical pupil 103, a curve with inflection points at a pitch p is drawn.

Now referring to FIG. 3, the advantage deriving from the feature of the present invention that the curvature of the free curved reflective surface fluctuates with inflection points is described. In the following, axially asymmetric optical systems according to preferred embodiments of the present invention will be described. However, the advantage deriving from this feature can be obtained also in axially symmetric optical systems, and here, a case of using an axially symmetric reflective surface in an observing system is described. FIG. 3 is a schematic virtual view to simplify the description, and the actual curvature and the actual shape are different from those in FIG. 3.

the curved surface at a plane including a line section a'P, at a plane including a line section b'P and at a plane including a line section c'P must be similar to each other. In order to meet this condition and in order to prevent astigmatic differences in the vertical direction and in the horizontal direction at the points a', b' and c' so as to inhibit the resolution from becoming lower, the following condition must be fulfilled.

$$Ra=Rb=Rc \quad (2)$$

From the expressions (1) and (2), the following expression is derived.

$$La=Lb=Lc \quad (3)$$

In conventional optical systems, even when a free curved surface is used as a reflective surface, as well as when a spherical surface or an aspherical surface is used, varying the curvature of the reflective surface gradually is not enough to meet the conditions (2) and (3).

The curvature of the reflective surface is varied with inflection points (the curvature is getting larger and getting smaller repeatedly) so that the reflective surface will meet the conditions (2) and (3). Thereby, curvature of field and distortion can be corrected, and images of high picture quality and with high resolution can be seen.

A curved reflective surface according to the present invention is composed of curved surfaces with curvatures which meet the condition (2), and the curvatures determine local powers. These curved surfaces are connected to each other via curved surfaces with a smaller or a larger curvature. Therefore, at portions of the curved surfaces with a smaller or a larger curvature, the resolution will be worse. However, if the curved reflective surface has inflection points at a smaller pitch p than the effective pupil, the aberration of the light more than a half of the whole light which is coming from the curved reflective surface to the effective pupil is corrected, and therefore, the resolution can be inhibited from becoming lower.

Also, when display means which displays an image pixel by pixel, such as a liquid crystal display, is used, it is not necessary to keep high resolution continuously, and distortion and curvature of field can be corrected more effectively.

As has been described, this arrangement gives the above-described-benefit to axially symmetric reflective surfaces. However, when this arrangement is applied to an axially asymmetric reflective surface, the benefit is more remarkable.

Further, an effective pupil means, in an image pickup system, the entrance pupil used for image pickup. In an observing system, the effective pupil means the pupils of an observer, and if the pupils of an observer are larger than the optical pupil, the effective pupil means the optical pupil.

According to the first embodiment, in an observing system, the effective pupil is 3 mm, and the pitch p is 2.5 mm. The optical pupil 103 is large, and specifically has a dimension of 12 mm in the x direction and a dimension of 6 mm in the y direction, so that an observer can see an image easily. The pupils of human beings are generally about 3 mm.

The pitch p of the inflection points of the curved reflective surface is larger in the peripheral portions because less quantity of light reflected at the peripheral portion is used in the effective pupil. In other words, the curved reflective surface has, in the center portion around the optical axis Q, inflection points at a smaller pitch than the effective pupil, and in the peripheral portions, the curved reflective surface has inflection points at a larger pitch than the effective pupil.

When an observer sees an image displayed on display means, there may be the following problems: the contrast of the image is lowered because of incidence of external light; or the picture quality is lowered because of stray light.

In the following, in order to provide a display apparatus which cuts external light, which is small and light and which displays an image of high quality, display apparatuses according to a second embodiment and a third embodiment are described.

Second Embodiment; See FIG. 4

A display apparatus 120A according to the second embodiment of the present invention comprises the above-described optical system 100 according to the first embodiment of the present invention. In FIG. 4, the numeral 121 denotes a light-transmitting type liquid crystal display (LCD), the numeral 122 denotes a back light, and the numeral 123 denotes a polarizer.

The LCD 121 modulates light emitted from the back light 122 in accordance with image data and displays an image with a polarization in a direction shown by arrow "A". The image light is reflected by the free curved reflective surface 102a and passes through the polarizer 123 which has a transmitting axis in a direction shown by arrow "B". Then, the light is directed to the optical pupil 103. The light on the optical pupil 103 is partly or entirely incident to the eyes of an observer, so that the observer can see the image as a virtual image.

The entire display apparatus 120A except the polarizer 123 is arranged in a case 129, and unnecessary external light is shut out. Because the polarizer 123 absorbs light coming from directions perpendicular to the direction B, the polarizer 123 transmits only a half of the quantity of light coming from outside. Thus, the quantity of external light incident to the display apparatus 120A is very small. Also, since the polarizing direction A of the LCD 121 and the polarizing direction B of the polarizer 123 correspond to each other, the image is not dark.

Third Embodiment; See FIG. 5

Figure 5:
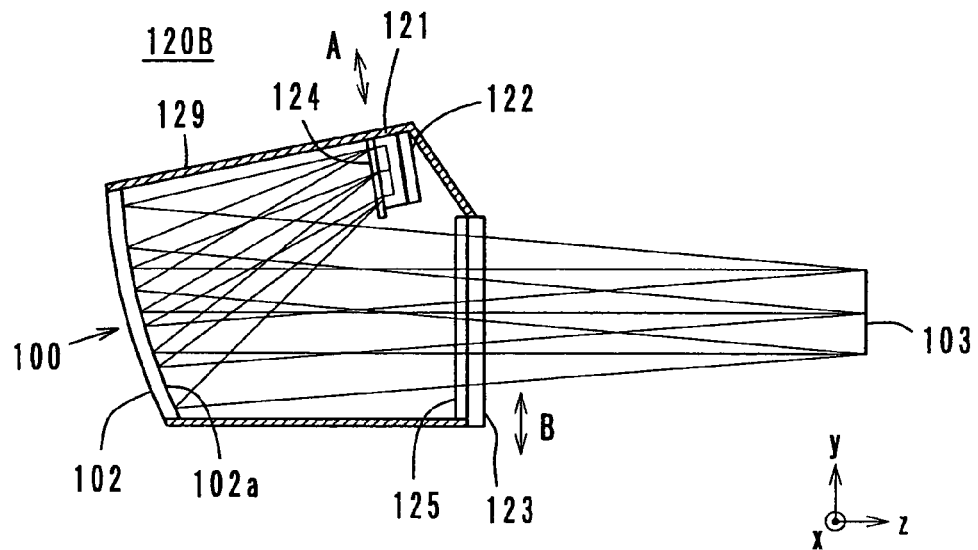
FIG. 5 is a schematic view of a display apparatus according to a third embodiment of the present invention.

FIG. 5 shows a display apparatus 120B according to the third embodiment of the present invention. The display apparatus 120B is basically of the same structure as the display apparatus 120A according to the second embodiment, and the display apparatus 120B further comprises a quarter-wave plate 124 provided on a front surface of the LCD 121 and a quarter-wave plate 125 provided on a back side of the polarizer 123.

The quarter-wave plate 124 is located between the free curved reflective surface 102a and the LCD 121, and the quarter-wave plate 125 is located between the free curved reflective surface 102a and the polarizer 123. The quarter-wave plates 124 and 125 do not need to be bonded or stuck respectively on the front surface of the LCD 121 and on the back side of the polarizer 123.

The quarter-wave plate 124 changes linearly (in the direction A) polarized light into clockwise polarized light. The quarter-wave plate 125 changes counterclockwise polarized light into linearly (in the direction B) polarized light. More specifically, the linearly (in the direction A) polarized light emitted from the LCD 121 is changed into clockwise polarized light by the quarter-wave plate 124, and the clockwise polarized light is reflected by the free curved reflective surface 102a and turns into counterclockwise polarized light. The counterclockwise polarized light is changed into linearly (in the direction B) polarized light by the quarter-wave plate 125, and the linearly polarized light passes through the polarizer 123.

The quarter-wave plates 124 and 125 are arranged such that the direction B of the second linear polarization will correspond to the direction A of the first linear polarization, and thereby, even if the respective phases shift more or less, sufficient polarizing performance can be achieved.

In the third embodiment, the quarter-wave plates 124 and 125 are provided for the purposes of minimizing the influence of external light and of preventing a double image.

In the structure of the second embodiment shown by FIG. 4, a half of the quantity of external light passes through the polarizer 123 and reflected in the polarizer 123. Then, because the direction of polarization does not change, the reflected light passes through the polarizer 123 and emerges outside toward the optical pupil 103. Consequently, unnecessary light is incident to the optical pupil 103.

In the third embodiment, the quarter-wave plate 125 is provided. In the structure, external light which has come inside through the polarizer 123 further passes through the quarter-wave plate 125 and reflected thereby. Then, when the reflected light is to emerge outside through the polarizer 123, the light has passed through the quarter-wavelength 125 back and forth. Thereby, the direction of polarization is turned at 90 degrees. Consequently, the light is absorbed by the polarizer 123 and does not emerge outside (toward the optical pupil 103).

This benefit of minimizing the influence of external light can be obtained by providing the quarter-wave plate 125 between the free curved reflective surface 102a and the polarizer 123. Also, by providing the quarter-wave plate 124 as well as the quarter-wave plate 125, the image is prevented from being darker in addition to achieving the benefit of minimizing the influence of external light.

In the structure of the second embodiment, the image light emitted from the LCD 121 is partly reflected by the side of the polarizer 123 which is closer to the optical pupil and is further reflected by the other side of the polarizer 123. Then, the light which has been reflected in the polarizer 123 twice emerges outside through the polarizer 123, and consequently, a double image is caused.

In the structure of the third embodiment comprising the quarter-wave plates 124 and 125, however, especially when the quarter-wave plate 125 is bonded or stuck on the back side of the polarizer 123, the light which has been reflected by the side of the polarizer 123 which is closer to the optical pupil is reflected by the side of the quarter-wave plate 125 which is closer to the reflective surface 102. The light which was reflected by the side of the polarizer 123 which is closer to the optical pupil and came to the side of the quarter-wave plate 125 which is closer to the reflective surface 125 has passed through the quarter-wave plate 125 back and forth, and therefore, the direction of polarization has turned at 90 degrees. Consequently, the light is absorbed by the polarizer 123, and a double image does not occur.

Fourth Embodiment; See FIG. 6

Figure 6:
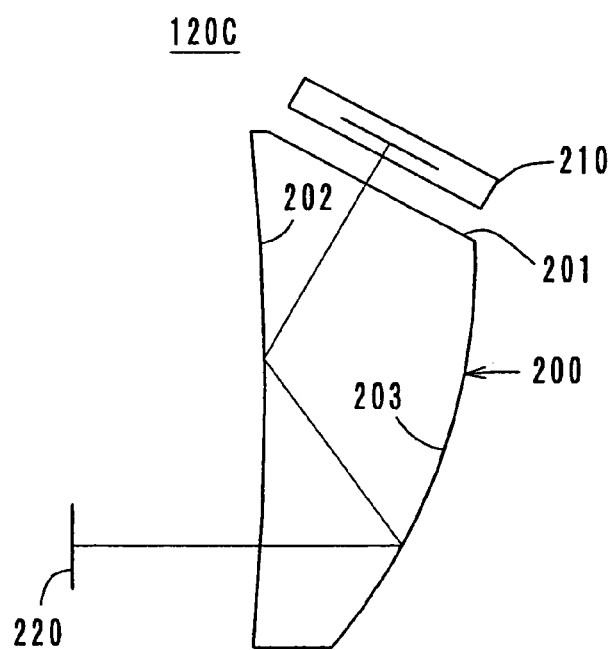
FIG. 6 is a schematic view of a display apparatus according to a fourth embodiment of the present invention.

FIG. 6. shows a display apparatus 120C according to a fourth embodiment of the present invention. In the display apparatus 120C, a prism 200 is used. The numeral 210 denotes an LCD, and the numeral 220 denotes an optical pupil. Image light displayed on the LCD 210 is incident to the prism 200 through an entrance surface 201. The light is entirely reflected by a surface 202 and further reflected by a free curved reflective surface 203 of which curvature fluctuates with inflection points. Then, the light passes through the surface 202 and is incident to the optical pupil 220. An observer receives the light of the optical pupil 220 on his/her own pupils and sees a virtual image.

In the fourth embodiment, the entrance surface 201 and the surface 202 of the prism 200 are free curved surfaces. However, the surfaces 201 and 202 may be planes or spherical surfaces.

Fifth Embodiment; See FIG. 7

FIG. 7 shows a display apparatus 120D according to a fifth embodiment of the present invention. The display apparatus 120D is of a head mounted type, and the display apparatus 120A according to the second embodiment is installed in a case 301. The case 301 is held before the eyes of an observer by a forehead pad 302 and a holder 303.

The display apparatus installed in the case 301 may be the one according to the first embodiment or the one according to the third embodiment as well as the one according to the second embodiment.

Next, display apparatuses according to a sixth through an eleventh embodiments of the present invention which do not cause chromatic aberration and which are suited to be used as a head mounted type are described.

Sixth Embodiment; See FIG. 8

Figure 8:
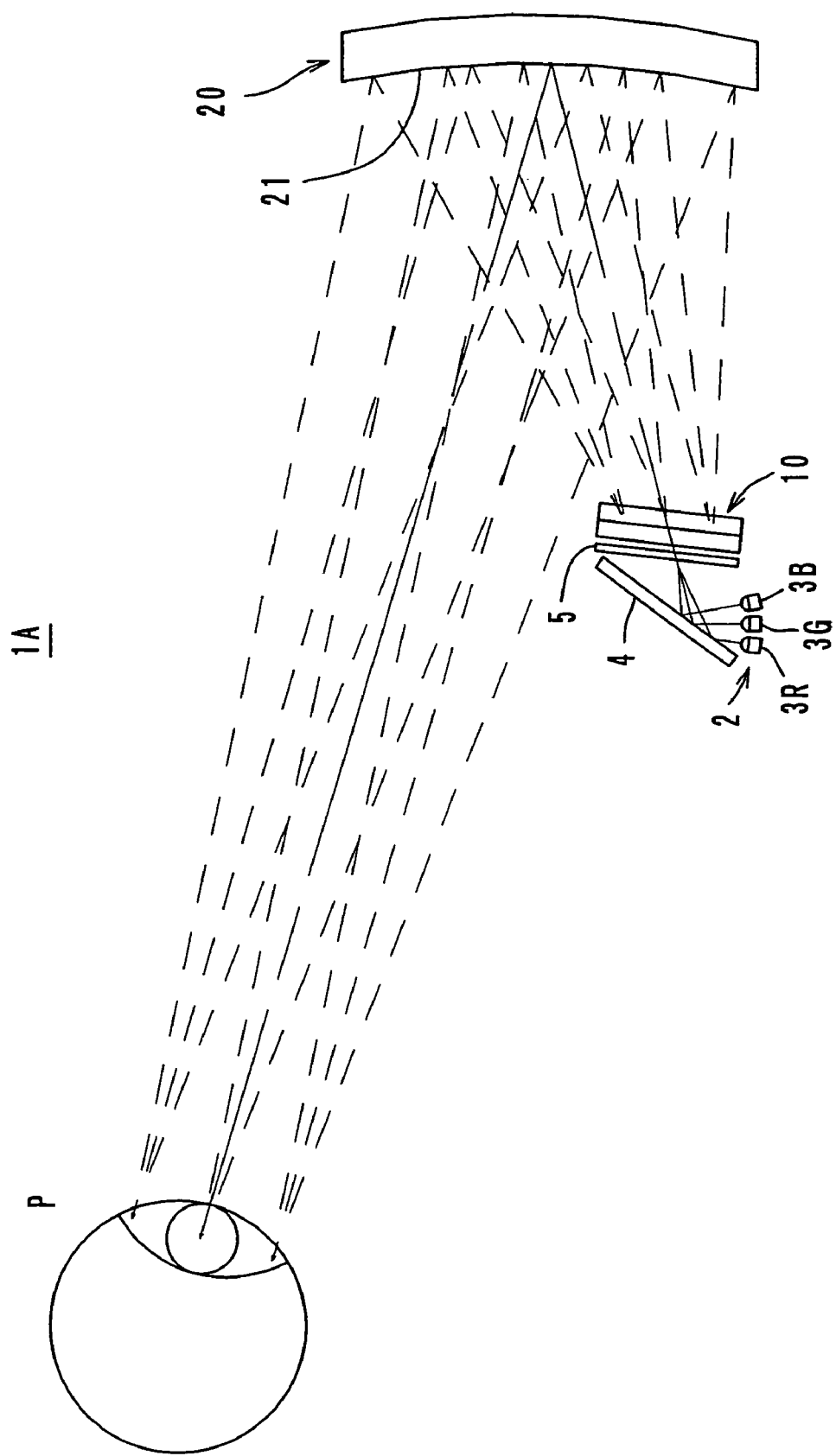
FIG. 8 is a schematic view of a display apparatus according to a sixth embodiment of the present invention.

FIG. 8 shows a display apparatus 1A according to the sixth embodiment. The display apparatus 1A comprises a light source unit 2, an image forming device 10 and a magnifying optical system 20.

The light source unit 2 comprises light emitting diodes 3R, 3G and 3B, a planar illuminating mirror 4 and a diffusing plate 5. The light emitting diodes 3R, 3G and 3B emit a bundle of red rays, a bundle of green rays and a bundle of blue rays, respectively, sequentially at specified intervals. Each of the bundles of rays is reflected by the illuminating mirror 4 and illuminates the image forming device 10 via the diffusing plate 5.

In the image forming device 10, a light-transmitting type LCD is used as a light modulating device. Each of the pixels of the LCD is illuminated by the bundles of rays with different wavelengths emitted from the light emitting diodes 3R, 3G and 3B sequentially and modulates the respective bundles of rays in response to the different wavelengths. In this way, the image forming device 10 forms a color image by a field sequential driving method. More specifically, the light modulating device, in synchronization with emitting of bundles of rays from the respective light sources 3R, 3G and 3B, forms monochromatic images at specified intervals at a high speed. Consequently, an observer can see a color image by an after image effect.

When an image is formed by a field sequential driving method, each pixel displays R, G and B images sequentially, and therefore, essentially, a color shift is not caused. Also, compared with a color filter type, the vignetting factor is large.

Figure 16:
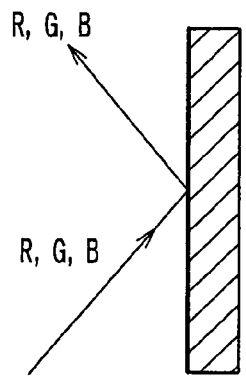
FIG. 16 is an illustration which shows diversions of bundles of rays by reflection.
Figure 17:
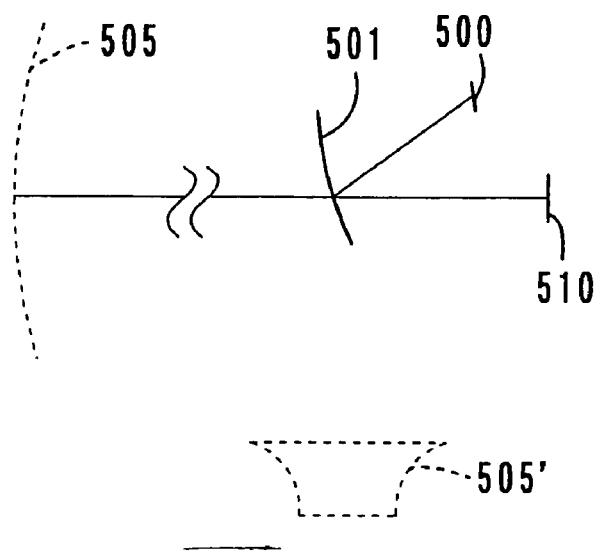
FIG. 17 is an illustration which shows distortion occurring in a conventional display apparatus.
Figure 18:
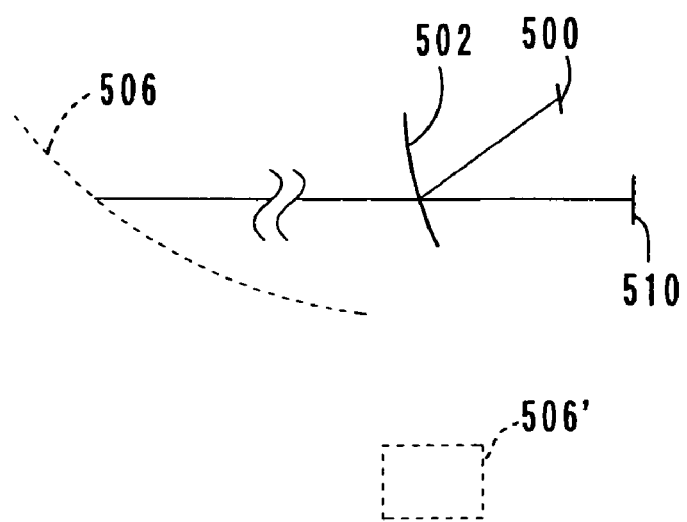
FIG. 18 is an illustration which shows curvature of field occurring in a conventional display apparatus.

The magnifying optical system 20 is composed of a concave reflective mirror coated with metal 21. The light modulated by the image forming unit 10 is reflected by the concave reflective mirror 21 to be directed to the pupils P of an observer. Because the bundle of red rays R, the bundle of green rays G and the bundle of blue rays B are diverted by the reflective surface at the same angle (see FIG. 16), chromatic aberration does not occur.

In the sixth embodiment, the concave reflective mirror 21 is an axially asymmetric aspherical surface, and the position and the construction data thereof will be shown in Table 2 later. The axially asymmetric aspherical surface of the reflective mirror 21 is of the same shape of the free curved reflective surface 102a in the first embodiment.

Figure 9:
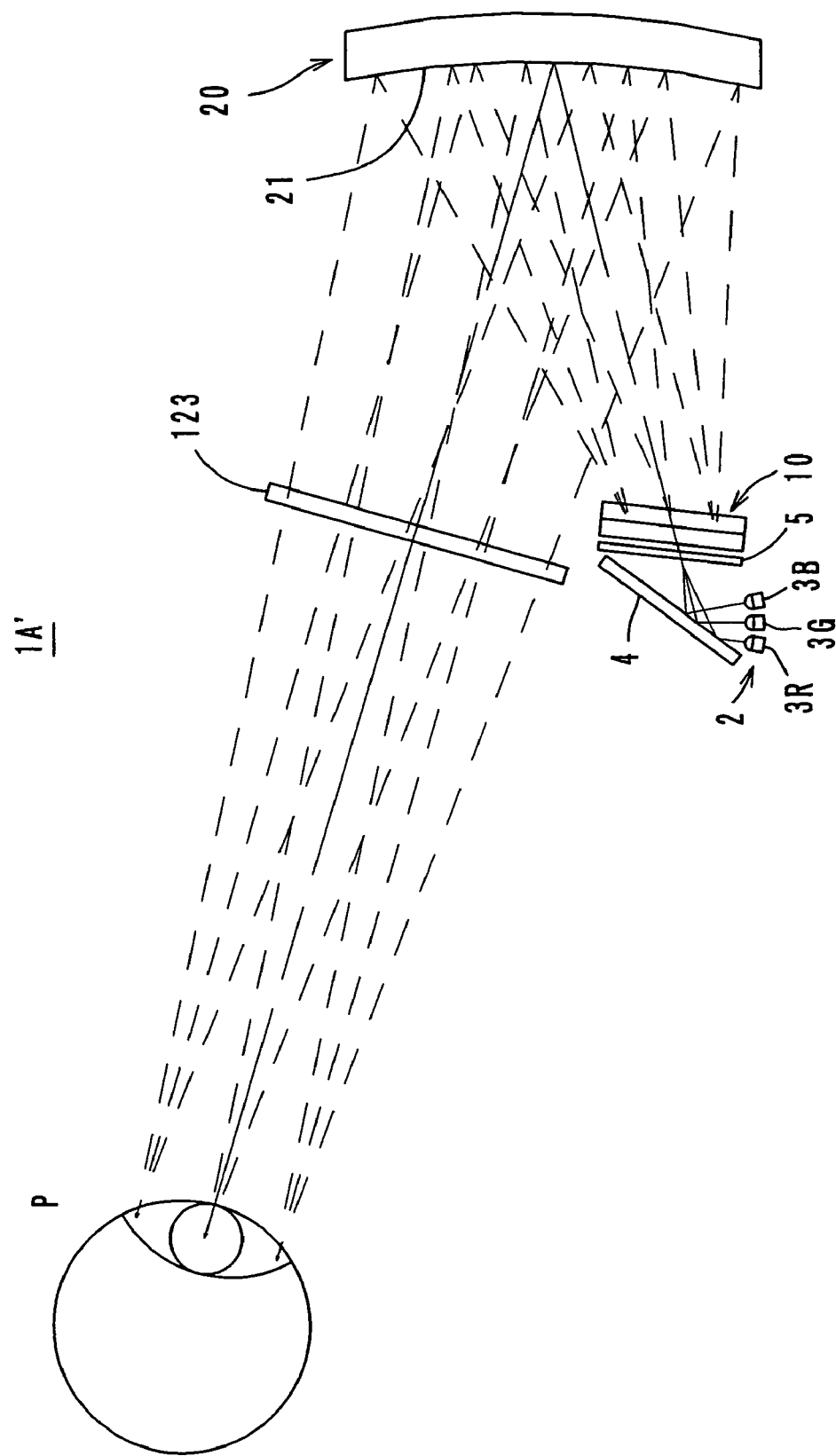
FIG. 9 is a schematic view of a display apparatus according to a seventh embodiment of the present invention.

Seventh Embodiment; See FIG. 9

A display apparatus 1A' according to the seventh embodiment of the present invention is basically of the same structure as the display apparatus 1A according to the sixth embodiment. In the display apparatus 1A', a polarizer 123 which was described in connection with the second embodiment is provided between the magnifying optical system 20 and the pupil P.

The entire of the display apparatus 1A' except the polarizer 123 is encased, and the function of the polarizer 123 and the benefits obtained thereby are the same as described in connection with the second embodiment.

Eighth Embodiment; See FIG. 10

Figure 10:
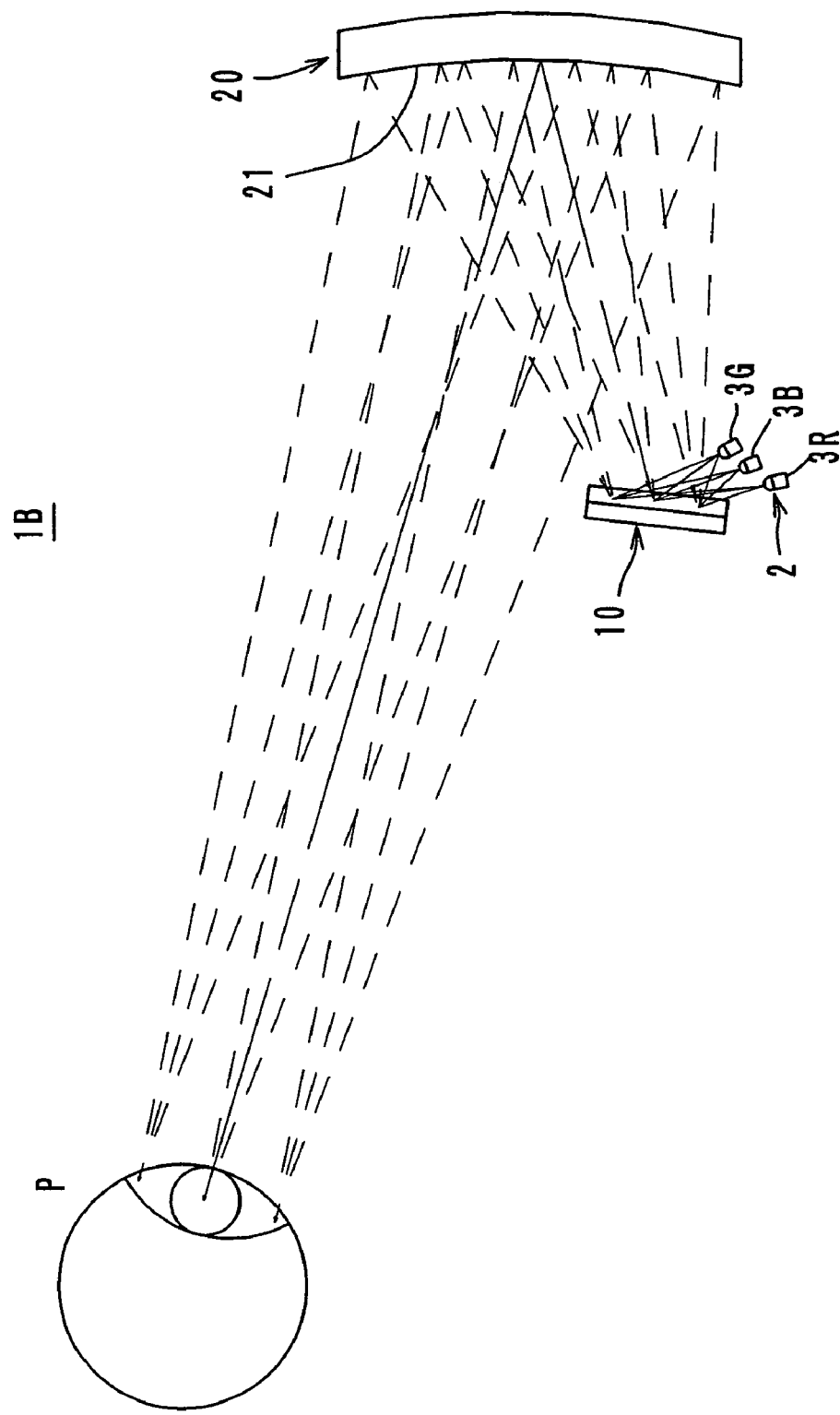
FIG. 10 is a schematic view of a display apparatus according to a eighth embodiment of the present invention.

FIG. 10 shows a display apparatus 1B according to the eighth embodiment of the present invention. In the image forming device 10 of the display apparatus 1B, a reflective type LCD is used as a light modulating device. The other components of the display apparatus 1B are the same as those of the display apparatus 1A according to the sixth embodiment. In FIG. 10, these components are provided with the same reference numerals provided in FIG. 8, and the descriptions of these components are omitted. In the eighth embodiment, the concave reflective mirror 21 is axially asymmetric aspherical surface, and the position and the construction data thereof are the same as those of the reflective mirror 21 in the sixth embodiment and will be shown in Table 2 later.

In the eighth embodiment, since a reflective type LCD is employed in the image forming device 10, the use of an illuminating mirror 4 is no longer necessary. Thus, the light source unit can be structured compact. The use of a diffusing plate 5 is optional.

Also, the light emitting diodes 3R, 3G and 3B can be positioned farther from the pupils of an observer, and an observer can fit the display apparatus 1B on his/her head comfortably.

Figure 11:
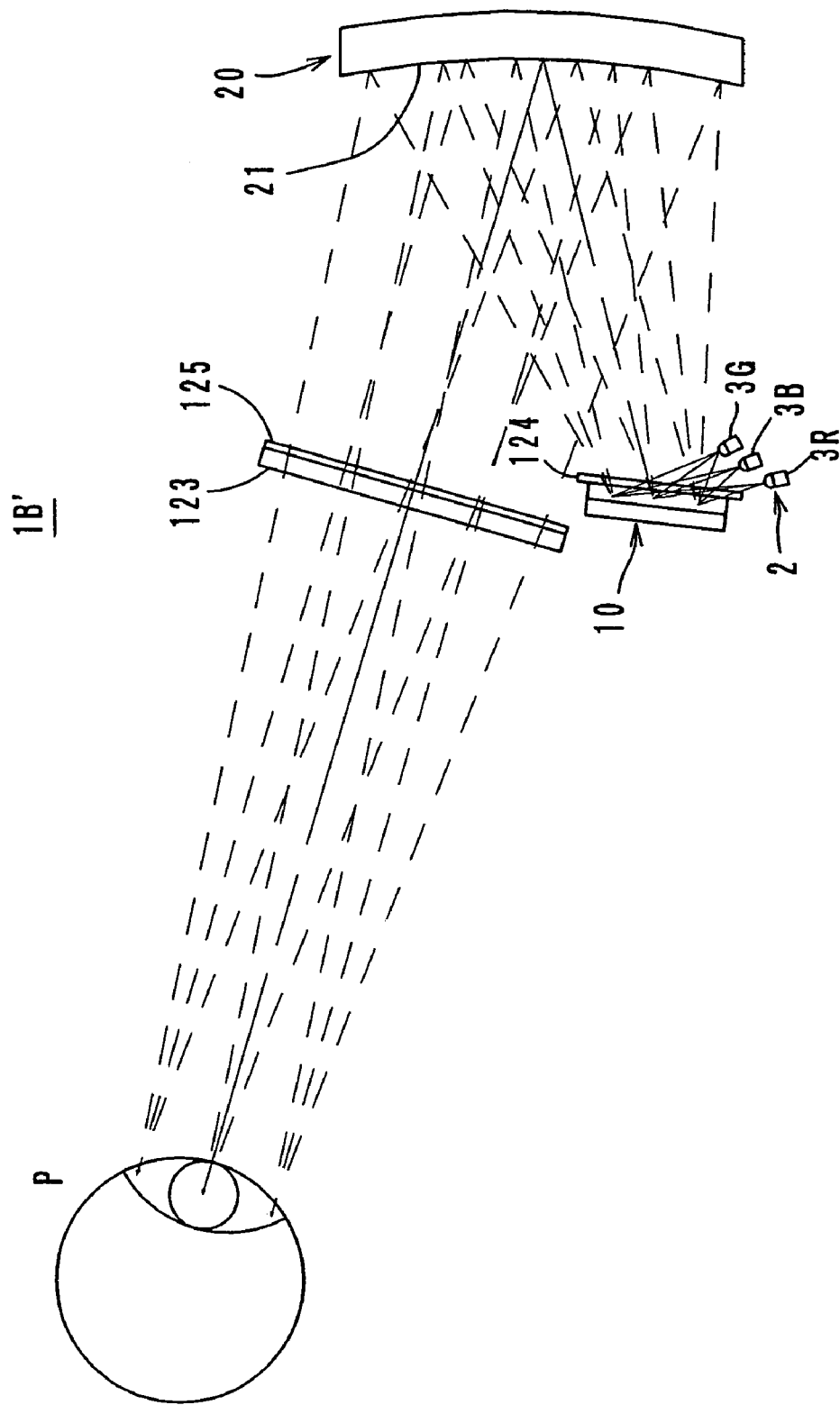
FIG. 11 is a schematic view of a display apparatus according to a ninth embodiment of the present invention.

Ninth Embodiment; See FIG. 11

A display apparatus 1B' according to the ninth embodiment of the present invention is basically of the same structure as the display apparatus 1B according to the eighth embodiment. In the display apparatus 1B', a polarizer 123 which was described in connection with the second embodiment is provided between the magnifying optical system 20 and the pupil P. Further, a quarter-wave plate 124 which was described in connection with the third embodiment is provided in front of the image forming device 10, and a quarter-wave plate 125 is provided on the back side of the polarizer 123.

The entire of the display apparatus 1B' except the polarizer 123 is encased, and the polarizer 123 and the quarter-wave plates 124 and 125 function in the same way and bring the same benefits as described in connection with the third embodiment.

Tenth Embodiment; See FIG. 12

Figure 12:
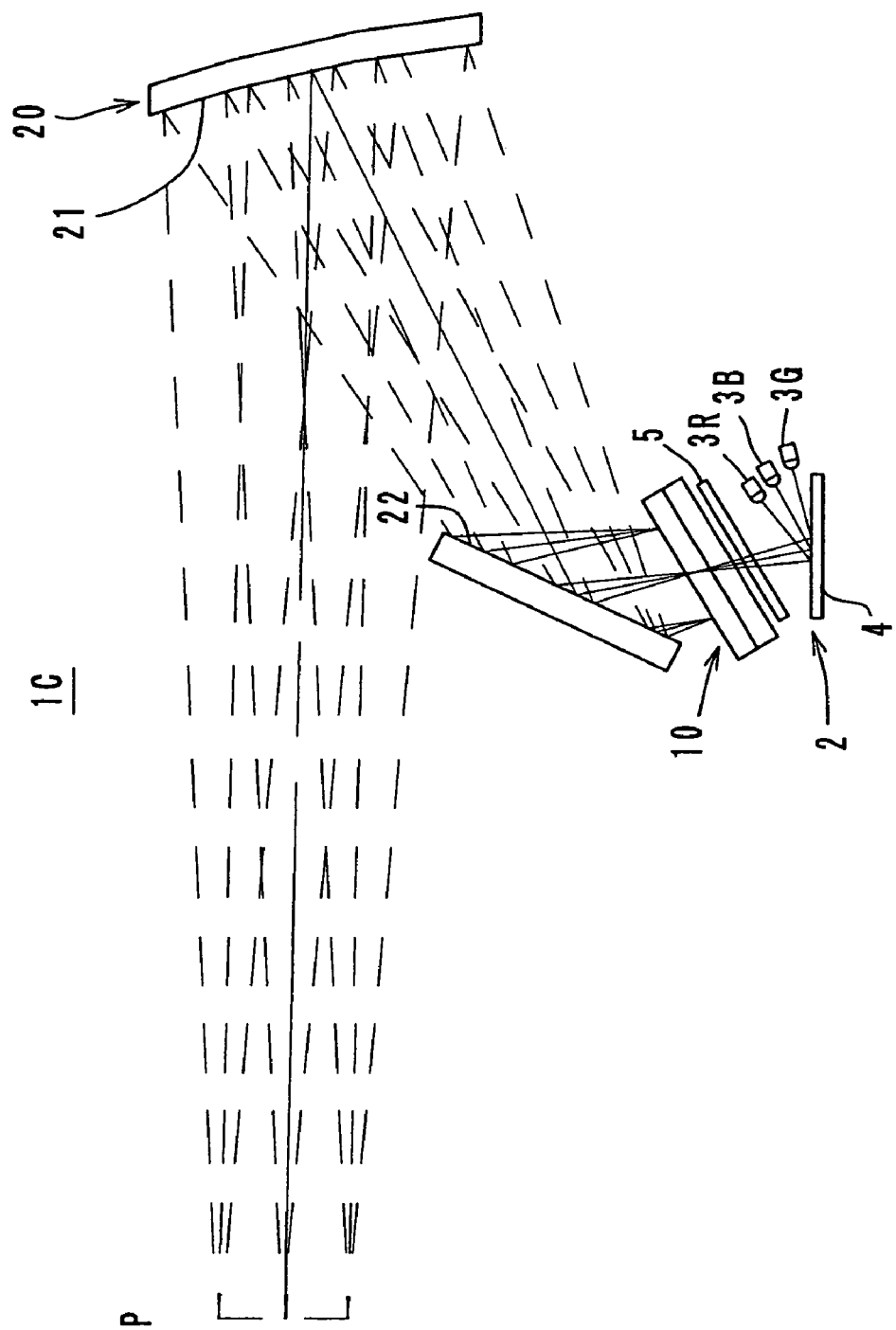
FIG. 12 is a schematic view of a display apparatus according to a tenth embodiment of the present invention.

FIG. 12 shows a display apparatus 1C according to the tenth embodiment of the present invention. In the display apparatus 1C, the magnifying optical system 20 comprises a concave reflective mirror 21 and a plane mirror 22. The display apparatus 1C comprises the other components of the display apparatus 1A according to the sixth embodiment, and in FIG. 12, these components are provided with the same reference numerals as those in FIG. 8.

In the tenth embodiment, the concave reflective mirror 21 is axially asymmetrical aspherical surface, and the position and the construction data thereof will be shown in Table 3 later.

The display apparatus 1C according to the tenth embodiment operates in the same way and brings the same benefits as described in connection with the sixth embodiment. Moreover, since the image light is reflected by the plane mirror 22, the light source unit 2 can be positioned farther from the pupils P of an observer, and an observer can fit the display apparatus 1C on his/her head comfortably.

Eleventh Embodiment; See FIG. 13

Figure 13:
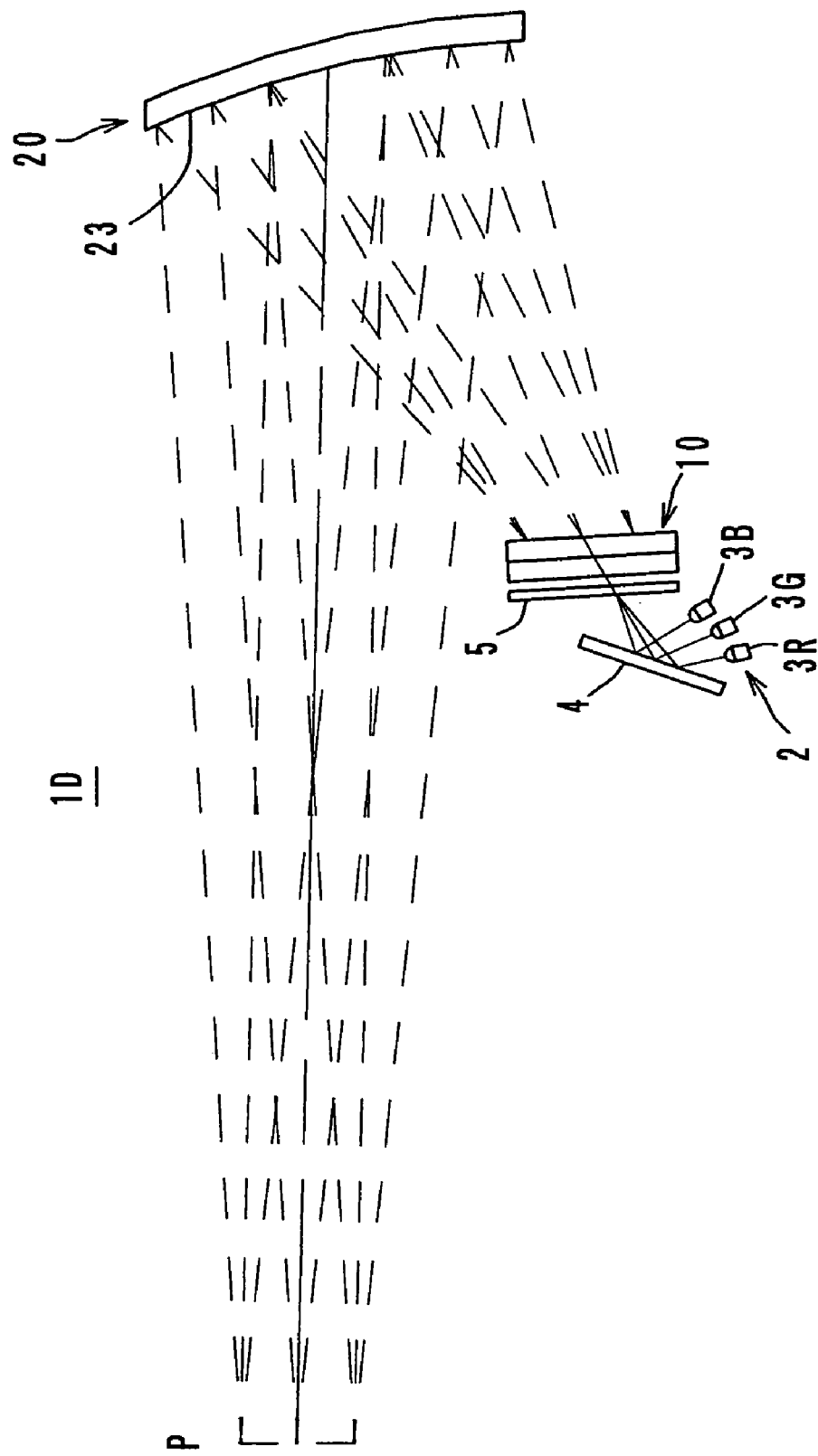
FIG. 13 is a schematic view of a display apparatus according to a eleventh embodiment of the present invention.
Figure 14A:
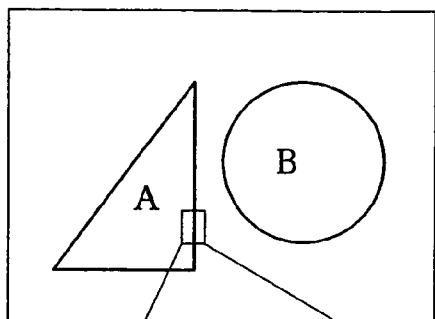
FIGS. 14a, b and c are illustrations of a color display apparatus, FIG. 14a showing a model of color images and FIGS. 14b and 14c showing light modulating elements.
Figure 14B:
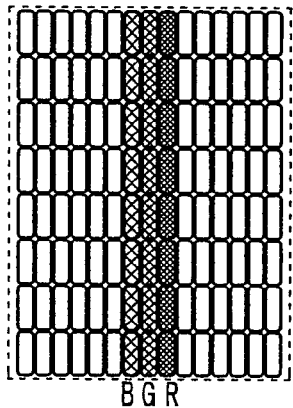
Figure 14C:
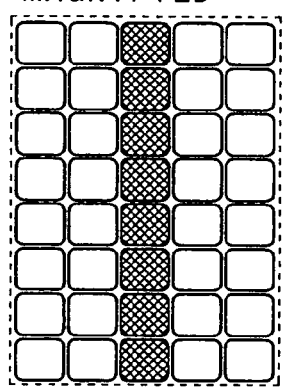
Figure 15:
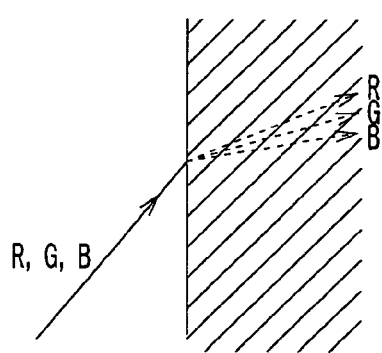
FIG. 15 is an illustration which shows diversions of bundles of rays by refraction.

FIG. 13 shows a display apparatus 1D according to the eleventh embodiment of the present invention. In the display apparatus 1D, the magnifying optical system 20 is composed of a concave reflective mirror 23. The concave reflective mirror 23 is an rotational symmetric aspherical surface, and the position and the construction data thereof will be shown in Table 4.

The display apparatus 1D comprises the other components of the display apparatus 1A according to the sixth embodiment. In FIG. 13, these components are provided with the same reference numerals as those in FIG. 8, and the descriptions thereof are omitted. These components function in the same way and bring the same benefits as described in connection with the sixth embodiment.

Definition, Position and Construction Data of Concave Reflective Surface

The concave reflective mirrors 21 which are used in the display apparatuses according to the sixth through tenth embodiments are axially asymmetric aspherical surfaces (free curved reflective surfaces). The axially asymmetric aspherical surfaces are defined by addition of an XY polynomial to a tenth polynomial based on a conic. The XY polynomial is developed with $x^m y^n$. The polynomial (1) is used. The position and the construction data of the concave reflective mirrors 21 which are used in the sixth through ninth embodiments are shown in Table 2 below, and the position and the construction data of the concave reflective mirror 21 which is used in the tenth embodiment are shown in Table 3 below.

The concave reflective mirror 23 which is used in the eleventh embodiment is a rotational symmetric aspherical surface and is defined by the following polynomial (2). The position and the construction data of the concave reflective mirror 23 which is used in the eleventh embodiment are shown in Table 4 below.

The construction data shown in Table 2, Table 3 and Table 4 are values in a global coordinate system of which origin is the center of pupil. The optical axis from the center of pupil to the reflective surface is Z, the vertical direction is Y, and the horizontal direction perpendicular to the Y direction is X. The positions of each surface in the respective directions X, Y and Z are shown. The unit is millimeter. The slants of each surface when the axes X, Y and Z are supposed to be axes of rotation are shown by A, B and C, respectively. The unit is degree.

$$Z = \frac{ch^2}{1 + SQRT(1-(1+k)c^2h^2)} + Ah^4 + Bh^6 + Ch^8 + Dh^{10} + Eh^{12} + Fh^{14} + Gh^{16} + Hh^{18} + Jh^{20}$$

Polynominal (2)

z: sag of surface in parallel to z direction c: curvature at vertex k: conic constant A, B, C, D, E, F, G, H, J: 4th, 6th, 8th, 10th, 12th, 14th, 16th, 18th, 20th variable coefficients

TABLE 2

Sixth and Seventh Embodiment

| surface | | radius of curvature | material | position and aspherical data | | | | | | |
|---|---|---|---|---|---|---|---|---|---|---|
| 1 | pupil | INFINITY | air | X | 0 | Y | 0 | Z | 0 |
| | | | | A | 0 | B | 0 | C | 0 |

TABLE 2-continued

Sixth and Seventh Embodiment

| surface | | radius of curvature | material | position and aspherical data | | | | | | | |
|---|---|---|---|---|---|---|---|---|---|---|---|
| 2 | mirror | INFINITY | reflective surface | X | 0 | Y | 3.934 | Z | 49.717 | | |
| | | | | A | 10.030 | B | 0 | C | 0 | | |
| | | axially asymmetric aspherical surface | | Y | −1.93E−01 | X2 | −1.31E−02 | Y2 | −1.25E−02 | | |
| | | | | X2Y | −4.24E−05 | Y3 | −2.34E−05 | X4 | −3.86E−06 | | |
| | | | | X2Y2 | −7.48E−06 | Y4 | −1.16E−06 | X4Y | 5.07E−08 | | |
| | | | | X2Y3 | −3.75E−07 | Y5 | −4.41E−09 | X6 | 1.12E−08 | | |
| | | | | X4Y2 | 8.33E−08 | X2Y4 | 3.66E−09 | Y6 | −1.48E−09 | | |
| | | | | X6Y | 4.95E−10 | X4Y3 | 8.87E−09 | X2Y5 | 2.43E−09 | | |
| | | | | X6Y2 | −4.75E−10 | X4Y4 | 1.08E−10 | X2Y6 | −1.75E−11 | | |
| | | | | X6Y3 | −7.54E−11 | X4Y5 | −1.79E−11 | X6Y4 | −4.86E−12 | | |
| | | | | X4Y6 | 1.44E−12 | | | | | | |
| 3 | display surface | INFINITY | BK7 | X | 0 | Y | −10.210 | Z | 33.757 | | |
| | | | | A | 9.427 | B | 0 | C | 0 | | |

TABLE 3

Eighth Embodiment

| surface | | radius of curvature | material | position and aspherical data | | | | | | | |
|---|---|---|---|---|---|---|---|---|---|---|---|
| 1 | pupil | INFINITY | air | X | 0 | Y | 0 | Z | 0 | | |
| | | | | A | 0 | B | 0 | C | 0 | | |
| 2 | mirror | INFINITY | reflective surface | X | 0 | Y | −2.913 | Z | 40.609 | | |
| | | | | A | 4.052 | B | 0 | C | 0 | | |
| | | axially asymmetric aspherical surface | | Y | −1.04E−01 | X2 | −1.14E−02 | Y2 | −1.10E−02 | | |
| | | | | X2Y | −3.90E−06 | Y3 | 1.17E−05 | X4 | −9.64E−07 | | |
| | | | | X2Y2 | −4.97E−06 | Y4 | −4.88E−06 | X4Y | −1.63E−06 | | |
| | | | | X2Y3 | −1.26E−07 | Y5 | −3.29E−07 | X6 | −4.10E−08 | | |
| | | | | X4Y2 | 1.42E−07 | X2Y4 | −2.69E−07 | Y6 | 4.83E−08 | | |
| | | | | X6Y | 3.85E−08 | X4Y3 | 5.61E−08 | X2Y5 | 6.82E−08 | | |
| | | | | X6Y2 | −1.89E−09 | X4Y4 | −3.28E−09 | X2Y6 | −4.20E−09 | | |
| | | | | X6Y3 | −1.65E−09 | X4Y5 | −1.11E−09 | X6Y4 | 2.11E−10 | | |
| | | | | X4Y6 | 7.23E−11 | | | | | | |
| 3 | mirror | INFINITY | reflective surface | X | 0 | Y | −5.000 | Z | 25.000 | | |
| | | | | A | −25.000 | B | 0 | C | 0 | | |
| 4 | display surface | INFINITY | BK7 | X | 0 | Y | −12.272 | Z | 24.557 | | |
| | | | | A | 121.582 | B | 0 | C | 0 | | |

TABLE 4

Ninth Embodiment

| surface | | radius of curvature | material | position and aspherical data | | | | | | | |
|---|---|---|---|---|---|---|---|---|---|---|---|
| 1 | pupil | INFINITY | air | X | 0 | Y | 0 | Z | 0 | | |
| | | | | A | 0 | B | 0 | C | 0 | | |
| 2 | mirror | INFINITY | reflective surface | X | 0 | Y | −27.488 | Z | 45.655 | | |
| | | | | A | −28.723 | B | 0 | C | 0 | | |
| | | rotational symmetrical aspherical surface | | K | −0.09268 | A | −0.21E−05 | B | 0.16E−08 | | |
| | | | | C | −0.63E−12 | D | −0.19E−15 | | | | |
| 3 | display surface | INFINITY | BK7 | X | 0 | Y | −10.230 | Z | 31.957 | | |
| | | | | A | 4.674 | B | 0 | C | 0 | | |

In the sixth through ninth embodiments, the angle of field of the screen is 14 degrees in the X direction and 10 degrees in the Y direction. In the tenth embodiment, the angle of field of the screen is 10.7 degrees in the X direction and 8 degrees in the Y direction. In the eleventh embodiment, the angle of field of the screen is 14 degrees in the X direction and 10 degrees in the Y direction.

When the angle of field in the horizontal direction (X direction) and the angle of field in the vertical direction (Y direction) are different from each other, it is preferred that the concave reflective mirror 21 or 23 is decentered in the direction in which the angle of field is smaller. As the amount of decentration of a concave reflective mirror becomes larger, the aberration caused thereby becomes more remarkable. Therefore, if the concave reflective mirror is decentered in the direction in which the angle of field is smaller, the amount of decentration is smaller, and the aberration caused thereby is weaker.

Other Embodiments

Although the display apparatuses according to the second, third and fourth embodiments are observing systems (optical systems for forming virtual images), these apparatuses can be structured as image pickup systems (optical systems for forming real images). The apparatuses according to the first through fifth embodiments are composed of reflective optical elements. However, it also will bring benefits to combine a lens or a diffraction optical element with the free curved reflective surface according to the present invention. Especially when a mirror is combined with a free curved reflective surface of which curvature fluctuates with inflection points, the benefits are remarkable. When light is incident to a mirror at a slant, generally, large aberration occurs. However, the free curved reflective surface can correct the aberration.

Various kinds of light sources can be used. In the sixth through eleventh embodiments, light emitting diodes are used as the light sources R, G and B. However, a combination of a white light source with an RGB color filter wheel is possible, and in this case, while a bundle of red rays R, a bundle of green rays G and a bundle of blue rays B are selectively transmitted to illuminate the image forming device sequentially.

Also, various kinds of illuminating systems can be used. In the sixth, tenth and eleventh embodiments, the illuminating system is composed of a plane mirror and a diffusing plate. However, a light guide may be used. By using a light guide, a thin and compact illuminating system can be structured.

In the above-described embodiments, a light-transmitting type or a reflective type LCD is used as the light modulating device of the image forming device. However, various kinds of light modulating devices can be used as long as they are driven by a field sequential driving method. Alternatively, a light modulating device which modulates the direction of reflection of light which is incident thereto, such as a DMD made by U.S. Texas Instruments Incorporated, can be used.

Further, as the magnifying optical system, not only a total reflection mirror which has a metal coating totally but also a half reflection mirror which has a metal coating partly to reflect a part of a bundle of rays can be used. In a case of using a half reflection mirror, if a transparent material is used as the base of the mirror and if the back side of the mirror is shaped optimally to the shape of the surface, a see-through type with which the observer can see both the external world and the displayed image can be structured.

Although the present invention has been described with reference to the preferred embodiments, various changes and modifications are possible to those who are skilled in the art. Such changes and modifications are to be understood as being within the scope of the present invention.

What is claimed is:

1. A display apparatus comprising:
   a light source which emits bundles of rays of different wavelengths;
   an image forming device which forms a color image by a field sequential driving method in which while the image forming device is illuminated with the bundles of rays sequentially, the bundles of rays are modulated in accordance with the respective wavelengths in each pixel of the image forming device; and
   a magnifying optical system, being composed of one concave reflective surface, which directs light of the image formed by the image forming device to an observer's pupil by reflecting the light on the concave reflective surface which performs surface reflection,
   wherein the concave reflective surface is an axially asymmetric aspherical surface.

2. A display apparatus according to claim 1, wherein the magnifying optical system is composed of a half reflection mirror.

3. A display apparatus according to claim 1, further comprising:
   a polarizer which is located between the magnifying optical system and an optical pupil of the magnifying optical system.

4. A display apparatus according to claim 3, further comprising:
   a first quarter-wave plate which is located between the image forming device and the magnifying optical system; and
   a second quarter-wave plate which is located between the magnifying optical system and the polarizer.

5. A display apparatus according to claim 1, wherein the image forming device includes a reflective type liquid crystal display.

6. A display apparatus comprising:
   a light source which emits bundles of rays of different wavelengths;
   an image forming device which forms a color image by a field sequential driving method in which while the image forming device is illuminated with the bundles of rays sequentially, the bundles of rays are modulated in accordance with the respective wavelengths in each pixel of the image forming device; and
   a magnifying optical system, being composed of one concave reflective surface, which directs light of the image formed by the image forming device to an observer's pupil by reflecting the light on the concave reflective surface which performs surface reflection,
   wherein the concave reflective surface is decentered in a direction in which an angle of field is smaller.

7. A display apparatus according to claim 6, wherein the magnifying optical system is composed of a half reflection mirror.

8. A display apparatus according to claim 6, further comprising:
   a polarizer which is located between the magnifying optical system and an optical pupil of the magnifying optical system.

9. A display apparatus according to claim 8, further comprising:
   a first quarter-wave plate which is located between the image forming device and the magnifying optical system; and
   a second quarter-wave place which is located between the magnifying optical system and the polarizer.

10. A display apparatus according to claim 6, wherein the image forming device includes a reflective type liquid crystal display.

11. A display apparatus according to claim 6, wherein the image forming device includes a reflective type liquid crystal display.

12. A display apparatus comprising:
    a light source which emits bundles of rays of different wavelengths;
    an image forming device which forms a color image by a field sequential driving method in which while the image forming device is illuminated with the bundles of rays sequentially, the bundles of rays are modulated in accordance with the respective wavelengths in each pixel of the image forming device; and
    a magnifying optical system, being composed of one concave reflective surface, which directs light of the image formed by the image forming device to an observer's pupil by reflecting the light on the concave reflective surface which performs surface reflection, wherein the concave reflective surface is a free curved reflective surface of which curvature fluctuates with inflection points.

13. A display apparatus according to claim 12, wherein the magnifying optical system is composed of a half reflection mirror.

14. A display apparatus according to claim 12, further comprising:
a polarizer which is located between the magnifying optical system and an optical pupil of the magnifying optical system.

15. A display apparatus according to claim 14, further comprising:
a first quarter-wave place which is located between the image forming device and the magnifying optical system; and
a second quarter-wave plate which is located between the magnifying optical system and the polarizer.

* * * * *